Figure 1:
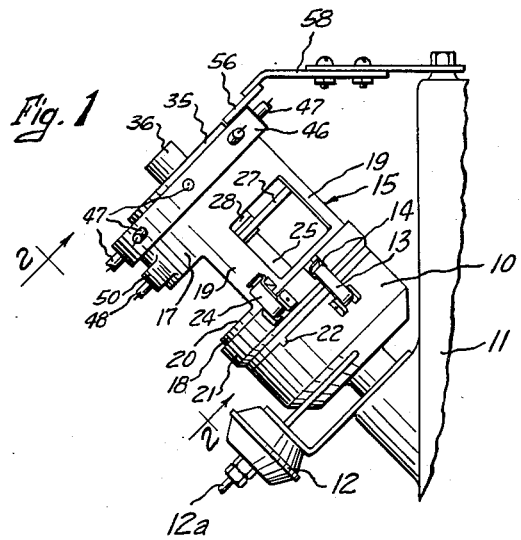

Oct. 16, 1951  E. A. SMITH  2,571,959
TESTING AND ADJUSTING DEVICE FOR INTERNAL-COMBUSTION
ENGINE IGNITION SYSTEMS
Filed April 19, 1948  2 SHEETS—SHEET 1

EUGENE A. SMITH
INVENTOR.

BY
ATTORNEY

Oct. 16, 1951           E. A. SMITH           2,571,959
TESTING AND ADJUSTING DEVICE FOR INTERNAL-COMBUSTION
ENGINE IGNITION SYSTEMS

Filed April 19, 1948           2 SHEETS—SHEET 2

EUGENE A. SMITH
*INVENTOR.*

BY *E. Hastings Ackley*

*ATTORNEY*

Patented Oct. 16, 1951

2,571,959

UNITED STATES PATENT OFFICE 2,571,959

TESTING AND ADJUSTING DEVICE FOR INTERNAL-COMBUSTION ENGINE IGNITION SYSTEMS

Eugene A. Smith, Dallas, Tex.

Application April 19, 1948, Serial No. 21,773

11 Claims. (Cl. 175—183)

This invention relates to new and useful improvements in testing and adjusting devices for internal combustion engine ignition systems, and more particularly to a device by means of which the spark timing and the dwell angle for each lobe of a cam of an ignition distributor may be tested and adjusted.

One object of the invention is to provide a device, arranged for use with the distributor of the ignition system of an internal combustion engine, by means of which the functioning and operation of the distributor points and spark timing advance may be observed and adjusted while the engine is running and without removing the distributor body from operative position on the engine.

Another object of the invention is to provide in a device of the character described means for utilizing a stroboscopic lamp to form a measurable arc of light indicating the dwell angle (the length of time or the number of degrees that the ignition points are closed) for each lobe of the cam of the distributor of the engine.

A further object of the invention is to provide a device of the character described which is so constructed and arranged that the stroboscopic light forms a measurable arc of light indicating the dwell angle for each lobe of the cam of the distributor and wherein the light arcs for each lobe are all simultaneously apparent and the dwell angles may be observed and checked and adjusted while the engine is running and without the necessity of disconnecting and reconnecting the testing mechanism or any part thereof.

Still another object of the invention is to provide a device of the character described by means of which the condition of each lobe of the cam of the distributor may be observed and inspected, whereby worn, deformed or unequal lobes causing improper ignition may be readily detected.

A still further object of the invention is to provide a device of the character described which is provided with means for visually observing the spark gap at each plug conductor wire, and wherein the device is provided with a scale for determining the spark advance under actual operating conditions while the engine is running.

Another object of the invention is to provide in a device of the character described means permitting the observation and testing of the centrifugal spark advance caused by actuation of the distributor mechanism; said device also being constructed and arranged to permit observation of the additional spark advance caused by the vacuum spark advance of vacuum actuated type distributors.

An important object of the invention is to provide a device of the character described which is so constructed and arranged that the timing of the engine may be observed and adjusted with the distributor on place on the engine.

Figure 2:
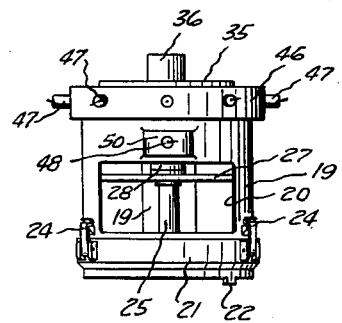
Figure 5:
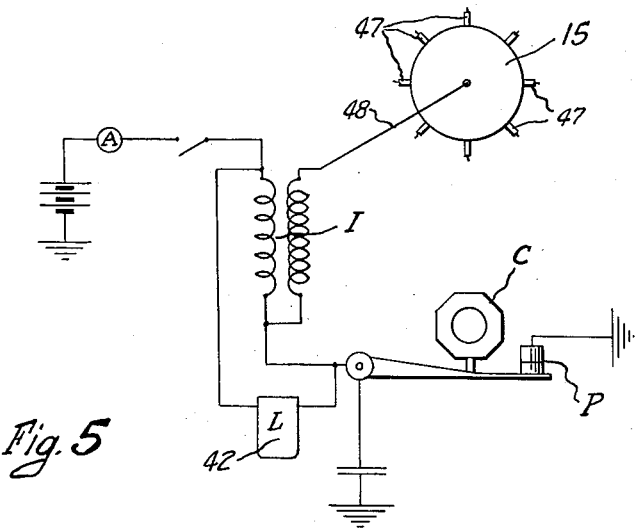
Figure 3:
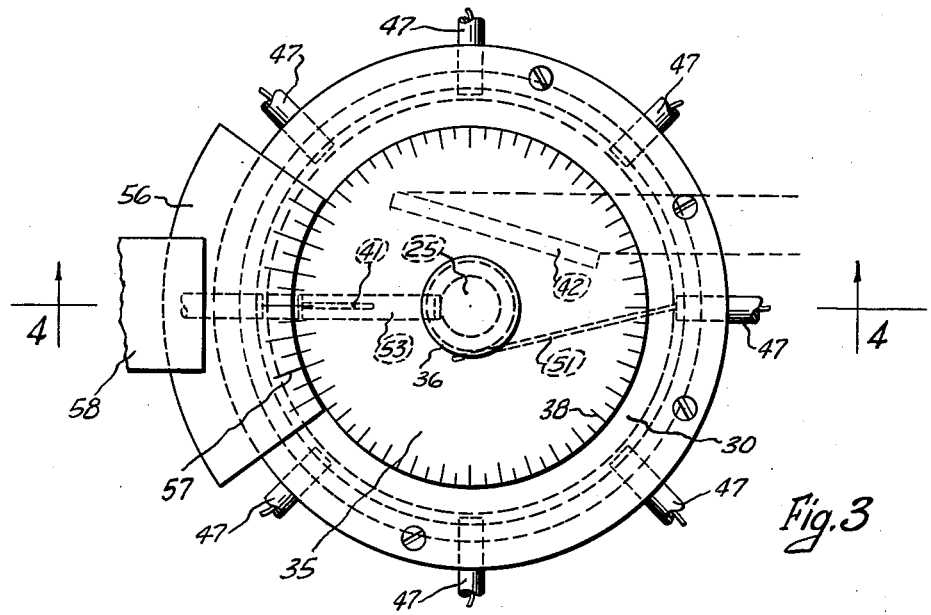
Figure 4:
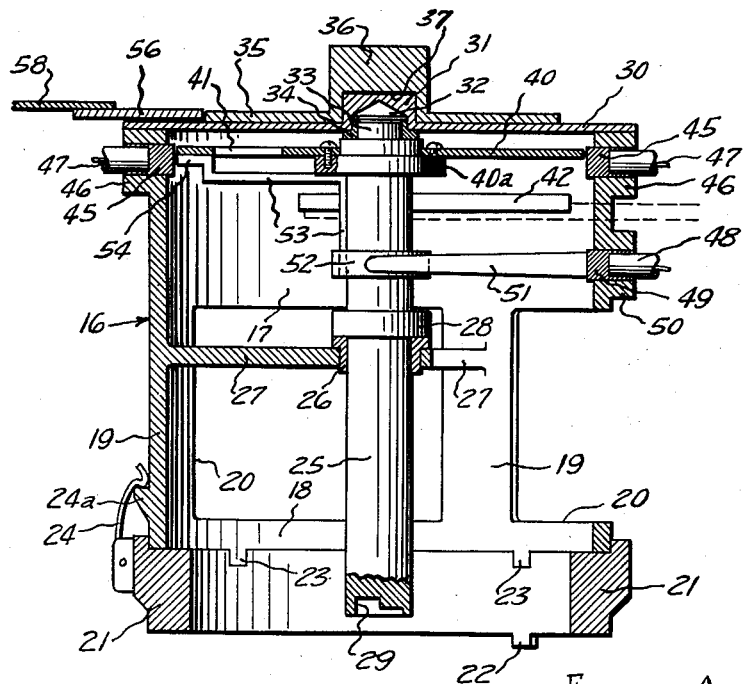

Additional objects and advantages of the invention will readily be apparent from the reading of the following description of a device constructed in accordance with the invention, and reference to the accompanying drawings thereof, wherein:

Figure 1 is a side elevation of the testing device mounted on the distributor body of an internal combustion engine, Figure 2 is a side elevation of the testing device of Figure 1, taken along the line 2—2 of Figure 1, Figure 3 is an enlarged plan view of the upper end of the testing device, Figure 4 is a transverse vertical sectional view of the testing device taken on the line 4—4 of Figure 3, and Figure 5 is a wiring diagram illustrating the manner in which the stroboscopic lamp is connected in the circuit of the ignition system.

In the drawings, the numeral 10 designates an ignition distributor body mounted on an engine 11 of an internal combustion type. Ignition distributors for automobiles or other multi-cylinder engines are so standardized in style and type that it is believed a portrayal of any one of the common types will illustrate amply the application of the invention to any other type. The distributor body illustrated in the drawings has mounted thereon a vacuum spark advance mechanism 12 for automatically advancing and retarding the spark in the customary manner. The usual cap or shell head and rotor element (not shown) of the distributor have been removed from the body and the ignition wires detached from the cap. A testing device 15 constructed in accordance with the invention is mounted on the distributor body in place of the usual cap, and the ignition wires have been connected to said testing device. The testing device is releasably held in place on the distributor body by the usual spring clips 13 on said body which engage over ears 14 on the testing device.

The testing device includes a frame 16 comprised of an upper ring 17 and a lower ring 18 spaced apart by vertically extending legs or struts 19, the space between said struts forming windows 20 through which the points and other parts of the distributor within the body 10 may be observed and adjusted or manipulated while the testing device is in place. Between the lower ring 18 and the upper rim of the distributor 10 is mounted an annular adaptor ring 21, the lower portion of which may be of any desired size and configuration required to fit any particular style, size or model of distributor body. The lower edge of the adaptor ring has provided thereon a key or lug 22 arranged to fit in the usual notch in the upper rim of the distributor body which is provided for setting the distributor cap (not shown) in correct operating position relative to the body. The position of the lug 22 on the adaptor ring is such that the testing device 15 is likewise positioned in correct relationship with the distributor body for operation thereon. Lugs 23 are formed on the bottom of the lower ring 18 of the frame of the testing device and are adapted to fit in recesses or notches in the upper edge of the adaptor ring 21 for correctly positioning and holding the frame portion 16 of the testing device in proper operating position with respect to the distributor body. Spring clips 24 on the adaptor ring engage over ears 24a on the frame 16 for detachably securing the frame in position on the adaptor ring.

An elongate rotor shaft extension 25 is mounted axially within the frame 16, extending through a bearing 26 carried by a spider 27 provided in the frame adjacent the upper ends of the windows 20. An external annular flange 28 on the rotor shaft extension engages against the upper surface of the bearing 26 to limit downward movement of the rotor shaft. The lower end of the rotor shaft is provided with a recess 29 which has a key lug formed therein for engaging in the notch at the upper end of the distributor rotor shaft (not shown) in the same manner as the usual distributor rotor member (not shown), whereby the shaft 25 forms an upward extension of the distributor rotor shaft and turns therewith.

A flat cap or cover member 30 is removably secured to the upper end of the upper ring 17 of the frame 16, and this cap has a boss 31 formed centrally of its upper surface. A recess 32 formed in the underside of the cap boss receives the reduced upper end 33 of the rotor shaft extension 25. An anti-friction bearing ring 34 is mounted between the cap member 30 and the upper end of the rotor shaft extension, and engages against the upwardly facing shoulder adjacent the reduced portion 33 thereof, whereby upward movement of the rotor shaft extension is limited by the cap member and bearing ring 34.

A flat dial or indicating disc 35 having an upwardly projecting central knob 36 is rotatably positioned upon the upper surface of the cap member 30. The knob of the indicating disc has a recess 37 in its underside which is arranged to fit over the boss 31 in the center of the cap member, whereby said boss serves as a shaft for rotation of the indicating disc. Angular indicia 38 are provided along the marginal edge of the indicating disc for a purpose which will be hereinafter more fully described. Both the cap member 30 and the indicating or dial disc 35 are transparent. The upper ring 17 of the frame is preferably opaque.

Just below the cap member 30, a thin opaque circular shield or rotor disc 40 is secured to an external annular flange 40a on the rotor shaft extension 25, whereby said shield is carried by and rotated with said shaft. This opaque disc or shield is provided with a narrow radially extending slit 41 near its outer edge positioned approximately below the angular indicia of the indicating disc 35, whereby light from a stroboscopic lamp 42 mounted within the upper end of the frame 16 of the testing device may pass through the slit 41 and be seen through the cap member 30 and the indicating disc 35. The stroboscopic lamp is connected in parallel with the primary winding of the ignition coil I and in series with the distributor points P (Fig. 5) so that the stroboscopic lamp will be lighted when the points are closed and will be extinguished when the points are opened. It is preferable that the light from the stroboscopic lamp be colored, such as red, in order that it may be readily distinguished when seen through the slit 41.

Since the opaque shield is rotated with the distributor shaft, and since the distributor points P are opened and closed by the cam lobes of the cam C on the distributor shaft, the stroboscopic lamp will be lighted during the periods the points are closed and due to the movement of the shield 40 the light passing through the slit 41 will appear to be the arc of a circle. This arc of light, indicating the period of time or the number of degrees of rotation of the distributor shaft during which the distributor points are closed, may be measured and read in degrees by reading directly from the indicator disc scale indicia 38, thus providing a means for determining whether the ignition points are set properly to produce the correct dwell angle. A similar arcuate light strip will be formed for each of the lobes of the cam on the distributor shaft as the points are opened and closed, and each arc may be measured in degrees to determine whether or not the cam lobes are uniform.

In order to provide for operation of the engine during the period of time which the testing device is installed on the distributor, spark plug wire receptacles or sockets 45 are provided in an external annular flange 46 at the upper end of the upper ring 17 of the testing device for receiving the spark plug wires 47. These sockets are spaced uniformly around the periphery of the flange to correspond to the number of cylinders of the engine being tested, and while eight spark plug wires are illustrated as being inserted in the socket terminals 45, it is obvious that the number of socket terminals may be four, six, or any other number or combination to correspond to the number of cylinders and spark plugs of the engine being tested. The conductor wires 47 extend from the sockets 45 to the spark plug terminals in the usual manner. The frame 16 of the testing device is preferably made of a non-conducting material, such as a non-conducting opaque plastic of the same character as that from which the usual distributor cap is formed, so that the spark plug wires and other electrical connections are insulated from each other. However, should the frame be made of metal, it is obvious that the electrical wires and connections may be insulated from the metal frame by a suitable insulating material interposed therebetween.

The high tension wire 48 from the high tension connection of the ignition coil I of the ignition system of the engine is inserted in a socket terminal or recess 49 formed in a boss or enlargement 50 on the side of the upper ring 17 of the frame of the testing device. The socket 49 and the high tension wire 48 connected therewith are electrically connected with an elongate spring wiper or brush 51 which projects inwardly into the bore of the frame and constantly engages a rotating contact ring 52 mounted on the rotor extension shaft 25. The contact ring may be made of carbon or any other suitable conductor material. A conductor strip 53 is electrically connected to the contact ring and extends upwardly along the shaft to the underside of the flange 41 at the upper end of said shaft, and then extends radially outwardly below the opaque shield 40 to a position at the edge of such shield to provide a sparking point 54 spaced slightly from the inwardly projecting ends of the spark plug wire socket terminals 45.

It will be seen, therefore, that electricity from the high tension wire 48 passes through the wiper or brush 51 to the contact ring 52 and thence through the conductor strip 53 to the sparking point 54, where the high tension spark jumps from the sparking point to the adjacent spark plug wire terminal sockets 45 and travels through the spark plug wires 47 to the spark plugs.

The mechanism just described replaces and functions in the same manner as the usual distributor cap and rotor member (not shown) which were removed to permit installation of the testing device, whereby the motor may be operated in the same manner as if the cap and rotor member were in place on the distributor body.

When it is desired to test the ignition system of an engine, all parts of the system are left intact on the vehicle in completely operative condition except the distributor cap or cover and the rotor element of the distributor, which are removed and replaced by the testing device 15 in the manner already described. The testing device is clamped to the upper end of the distributor body 10 and the spark plug wires 47 are inserted in the receptacles 45 and the high tension wire 48 is connected to the receptacle 49, whereupon the device is ready for use.

For testing the automatic centrifugal spark advance and the spark advance caused by the vacuum actuating mechanism 12, an arcuate transparent indicator scale 56 having angular indicia 57 along its concave edge is positioned above the cap member 30 of the testing device in proximity to the peripheral edge of the indicating disc 35. The arcuate indicator scale is carried by an elongate adjustable arm 58 which is preferably secured to the motor 11 or some other stationary part in such a manner that the scale remains stationary when the distributor housing and the testing device carried thereby are rotated about the axis of the distributor shaft as the spark is advanced in distributors of the type wherein the housing is movable. It is preferable that the indicator scale be set directly above one of the spark plug wire conductors 47, for a purpose which will be hereinafter more fully explained, but such is not absolutely necessary, since the graduations or indicia 57 may be set to correspond to the indicia 38 of the indicator dial 35 for the same purpose. Since the arcuate scale 56 remains stationary, it will be seen that any rotation of the housing about the axis of the distributor shaft may be read directly upon the stationary indicator scale 56. This reading will indicate the number of degrees which the spark has been advanced under operating conditions, and for distributors of the type wherein the housing is rotated solely by a vacuum actuating means 12, will indicate the vacuum spark advance. It is believed manifest, however, that where the housing rotates because of the automatic centrifugal advance due to rotation of the distributor shaft, the vacuum line 12a may be disconnected and accurate reading made of the rotation of the housing and the spark advance created thereby due to the centrifugal spark advance. The vacuum line may then be reconected and the additional spark advance due to the vacuum actuation may be read directly from the arcuate indicator scale.

Furthermore, by setting the indicator scale 56 directly above one of the spark plug wire contact sockets 45 after the No. 1 cylinder of the engine has been set at the proper point indicated by the timing marks on the crank shaft and timing gears of the engine, the distributor housing and points of the ignition system may be adjusted to bring the same into correct timing relationship for proper operation of the engine. This, however, is not an important feature of the invention.

After the timing device has been connected to the distributor body and the spark plug wires and high tension wire have been connected to the testing device, in the manner previously described, the engine may be started and will run in the usual manner. Due to the fact that the stroboscopic lamp 42 is connected in series with the points P of the distributor, as has already been explained, each time the points are closed the lamp will be lighted, and light from the lamp will pass through the slit 41 and be visible through the indicating disc 35. As has already been explained, the light passing through the slit 41 will appear to be an arcuate strip, due to the rotation of the opaque shield 40 during the interval of time which the stroboscopic lamp is lighted. The indicating disc 35 may then be turned in such a manner that the length of the arc may be read directly in degrees from the indicia 35 at the marginal edge of such disc. Thus, the dwell angle or the number of degrees of rotation of the cam shaft that the ignition points are permitted to remain closed may be read directly from the indicating disc. Furthermore, since the stroboscopic lamp is ignited each time the distributor points are permitted to close, there will be an arc of light visible through the indicating disc for each lobe of the cam C of the distributor, and the length of each arc may be read directly upon the indicia 38 of the indicating disc. Therefore, the dwell angle for each lobe of the cam may be observed simultaneously with the dwell angle light arc for each other lobe, and worn, deformed or unequal lobes causing improper ignition may be readily detected. It will further be seen that since the light arc for each lobe of the cam will appear simultaneously through the indicating disc 35, that the spacing of the light arcs from each other may be observed and inspected to further determine whether the cam lobes are worn, deformed or unequal.

If the light arcs observed through the indicating disc indicate to the operator that the dwell angle of the distributor is incorrectly set, the operator may reach through the windows 20 in the side of the frame 16 of the testing device and adjust the distributor points in such a manner that the dwell angle may be changed to the correct value. This operation may be performed without removing the testing device from the distributor body, and may also be performed while the engine is running, if desired. Therefore, a more accurate adjustment of the distributor points and the dwell angle may be effected with greater ease and in less time, and with the distributor body and parts in operating position on the engine.

For distributors of the type in which the body or housing does not turn when the spark is advanced, the type in which the interior mechanism of the distributor turns in the housing, the spark advance may be read directly upon the scale indicia 38 of the indicating disc 35 by setting the scale or disc at a zero reference point at the edge of one of the light arcs created by the light from the stroboscopic lamp passing through the slit 41 and the opaque shield 40 when the motor or engine is operating at low speed, whereupon movement of the distributor plate causing an advance in spark due to increase in speed of the engine will be readable by the movement of the light arc relative to the indicia on the indicating disc. Furthermore, a worn timing chain or worn timing gears will be indicated by vibration, oscillation or irregularity of the lighted arcs.

When the distributor points have been properly adjusted and set to obtain the correct dwell angle, and the spark advance and timing have been properly adjusted, the testing device 15 may be removed from the upper end of the distributor body and the usual rotor member and cap or cover member replaced thereon. The spark plug wires and high tension wires may then be reconnected in the distributor cap in the usual manner, whereupon the system is again ready for normal, customary use.

From the foregoing, it will be seen that a device has been provided for testing the ignition system of the distributor of the ignition system of an internal combustion engine while the same is in actual operation on the engine. The stroboscopic lamp is used in combination with the rotating opaque shield having the slit 41 therein to create an arc of light indicating the dwell angle for each lobe of the cam of the distributor. Furthermore, the light arcs for all of the cam lobes are apparent simultaneously. The light arcs and the indicating scale on the indicating disc 35 provide for a quick and accurate reading of the value of the dwell angle for each lobe of the distributor cam, and wear and deformation of the separate cam lobes may be readily observed and detected. Furthermore, means has been provide for testing the automatic centrifugal advance of the spark, either by means of the stationary arcuate scale 56 or by means of the travel of the light arcs formed by the stroboscopic lamp as the distributor plate is rotated, and means has been provided for testing the advance caused by the vacuum actuating mechanism in addition to the automatic centrifugal advance, whereby the total spark advance may be determined. Also, it will be seen that the engine may be timed, using the fixed scale of the arcuate scale 56 and the indicating disc scale 38.

It is believed readily apparent that the stroboscopic lamp 42 may be substantially circular or arcuate in configuration, or a plurality of lamps may be provided, if desired, to assure even illumination below the rotating opaque shield. The adaptor rings 21 provides for use of the testing device upon any make or size or type of distributor body, while the openings or receptacles 45 for the spark plug wires may be provided in any number adequate to accommodate testing of engines having any number of cylinders, such as four, six, eight, twelve, sixteen or the like.

Furthermore, the provision of the windows 20 in the frame of the testing device provide for access to the distributor points and the interior of the distributor body during actual operation thereof, whereby the points and other parts may be observed and adjusted or manipulated to obtain correct functioning while the testing device is in place on the distributor body and while the engine is running, if desired.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. An ignition testing device for testing the functioning of the ignition distributor of an internal combustion engine including, a body, a lamp carried by said body, means for causing said lamp to light during periods when the distributor breaker points are closed, means for measuring the arc of angular movement of the distributor cam shaft during which the lamp is lighted, said lamp being lighted each time an electrical circuit is established through the breaker points of a distributor, said testing device body being movable with the distributor body as such distributor body is turned to cause an advance in the spark timing, and a fixed member carrying reference indicia for indicating and measuring the arc of such movement of the body of the testing device.

2. An ignition testing device for testing the functioning of the ignition distributor of an internal combustion engine wherein the breaker plate mechanism of the distributor is moved as the spark timing is advanced and including, a body arranged to be mounted on the distributor body to operatively replace the standard distributor cap, a lamp carried by said body, means for causing said lamp to light during periods when the distributor breaker points are closed, means for limiting the exposure of the light of the lamp when the same is lighted, and a member on the body carrying angular reference indicia exposed to the limited light exposure from the lamp for indicating the angular movement of the breaker plate mechanism of the distributor as the same is moved to advance the spark timing.

3. An ignition testing device for testing the functioning of an internal combustion engine ignition distributor having interlocked separable cap and body portions and having ignition wires leading to the ignition coil and spark plugs of the engine and containing a rotatable shaft and rotor and a cam on said shaft actuating breaker points in the body, said testing device including, a body constructed and arranged to fit on the distributor body as a replacement for the distributor cap, a rotatable member in the body arranged to be rotated by the distributor shaft, an electrical conductor carried by the rotatable member for conducting ignition sparks to the spark plug wires, a shield member carried by the rotatable member in the body and rotatable therewith, said shield member having a narrow radially extending light opening therein, a lamp in the body and covered by the shield member so that light from the lamp will pass through the opening in the shield, means electrically connecting the lamp in the circuit by means of which electricity passes through the distributor breaker points whereby the lamp is lighted when the points are in closed contact and the light will pass through the opening in the shield as the same is rotated to form arcs of light, and indicia on the body adjacent the path of travel of the light opening in the shield member whereby the arcs of light passing through said opening as the shield is rotated and the lamp is lighted may be measured by readings on the indicia on the body.

4. An ignition testing device of the character set forth in claim 3 wherein, the body of the testing device is movable with the distributor body as such distributor body is turned to cause an advance in the spark timing, and a fixed member is positioned adjacent the indicia on the testing device, said fixed member carrying reference indicia for indicating movement of the body of the testing device with the distributor body.

5. An ignition testing device of the character set forth in claim 3 and wherein the breaker plate mechanism of the distributor is moved in the distributor body to advance the spark timing, said testing device including indicia on the testing device body for indicating angular movement of the breaker plate mechanism of the distributor.

6. An ignition testing device of the character set forth in claim 3 wherein, the body of the testing device is provided with an opening permitting access to the distributor parts within the distributor body, whereby said parts may be observed and adjusted without removing the testing device from such distributor body.

7. An ignition testing device of the character set forth in claim 3 wherein, interchangeable adaptor rings are releasably secured to the body of the testing device to provide for removably mounting the testing device on distributor housings of various sizes and styles.

8. An ignition testing device for testing the functioning of an internal combustion engine ignition distributor having interlocked separable cap and body portions and having ignition wires leading to the ignition coil and spark plugs of the engine and containing a rotatable shaft and rotor and a cam on said shaft actuating breaker points in the body, said testing device including, a frame having a housing at its upper end and a mounting ring at its lower end spaced from the housing by struts providing access openings to the interior of the frame between said struts, the housing at the upper end of the frame having opaque side walls and a transparent cover, said housing having spark plug wire terminal sockets provided in its periphery for receiving the wires leading to the spark plugs of the engine and having a high tension wire terminal receptacle also provided in its periphery for receiving the high tension wire from the ignition coil, a shaft rotatably mounted in the frame and arranged to be operatively connected to the distributor shaft for rotation thereby, an electrical conductor carried by the rotatable shaft for conducting ignition sparks to the spark plug wires, and having an electrical connection with the high tension wire terminal socket, an opaque shield member carried by the rotatable shaft and mounted in the housing below the transparent cover and rotatable with said shaft, said shield member having a narrow radially extending light opening provided therein near its periphery, a stroboscopic lamp in the housing and covered by the shield member so that light from the lamp will be limited to passage through the opening in the shield, means electrically connecting the stroboscopic lamp in the circuit by means of which electricity passes through the distributor points whereby the lamp is lighted when the points are in closed contact and the light will pass through the opening in the shield as the same is rotated to form arcs of light, a transparent disc rotatably mounted on the transparent cover of the housing and having angular indicia thereon, said indicia being positioned above the path of travel of the light opening in the shield member whereby the arcs of light passing through said opening as the shield is rotated and the lamp is lighted may be measured by reading the angular indicia on said disc, and means for releasably securing the frame of the testing device to the distributer body with the rotatable shaft of the testing device operatively connected with the distributor shaft.

9. An ignition testing device of the character set forth in claim 8 wherein, the body of the testing device is movable with the distributor body as such distributor body is turned to cause an advance in the spark timing, and a fixed member is positioned adjacent the angular indicia on the rotatable disc carried by the housing of the testing device, said fixed member carrying reference indicia for indicating angular movement of the body of the testing device as the distributor body is moved to cause spark advance.

10. In combination with an ignition testing device of the character set forth in claim 8, interchangeable adaptor rings which are so constructed and arranged as to be releasably secured to the mounting ring at the lower end of the frame of the testing device to provide for removably mounting the testing device on distributor housings of various sizes and styles.

11. An ignition testing device of the character set forth in claim 8 wherein, all movable parts of the testing device are mounted in the housing at the upper end of the frame of such testing device and the space between the struts separating the housing from the mounting ring provide for access to the distributor parts within the distributor body whereby said distributor parts may be manipulated and adjusted without removing the testing device from the distributor body and while the distributor is in operation.

EUGENE A. SMITH.

REFERENCES CITED

The following references are of record in the file of this patent:

UNITED STATES PATENTS

| Number | Name | Date |
| --- | --- | --- |
| 1,966,066 | Haskins | July 10, 1934 |
| 2,067,256 | Brush | Jan. 12, 1937 |
| 2,305,018 | MacGillivray | Dec. 15, 1942 |
| 2,411,782 | Wass et al. | May 18, 1948 |